UNITED STATES PATENT OFFICE.

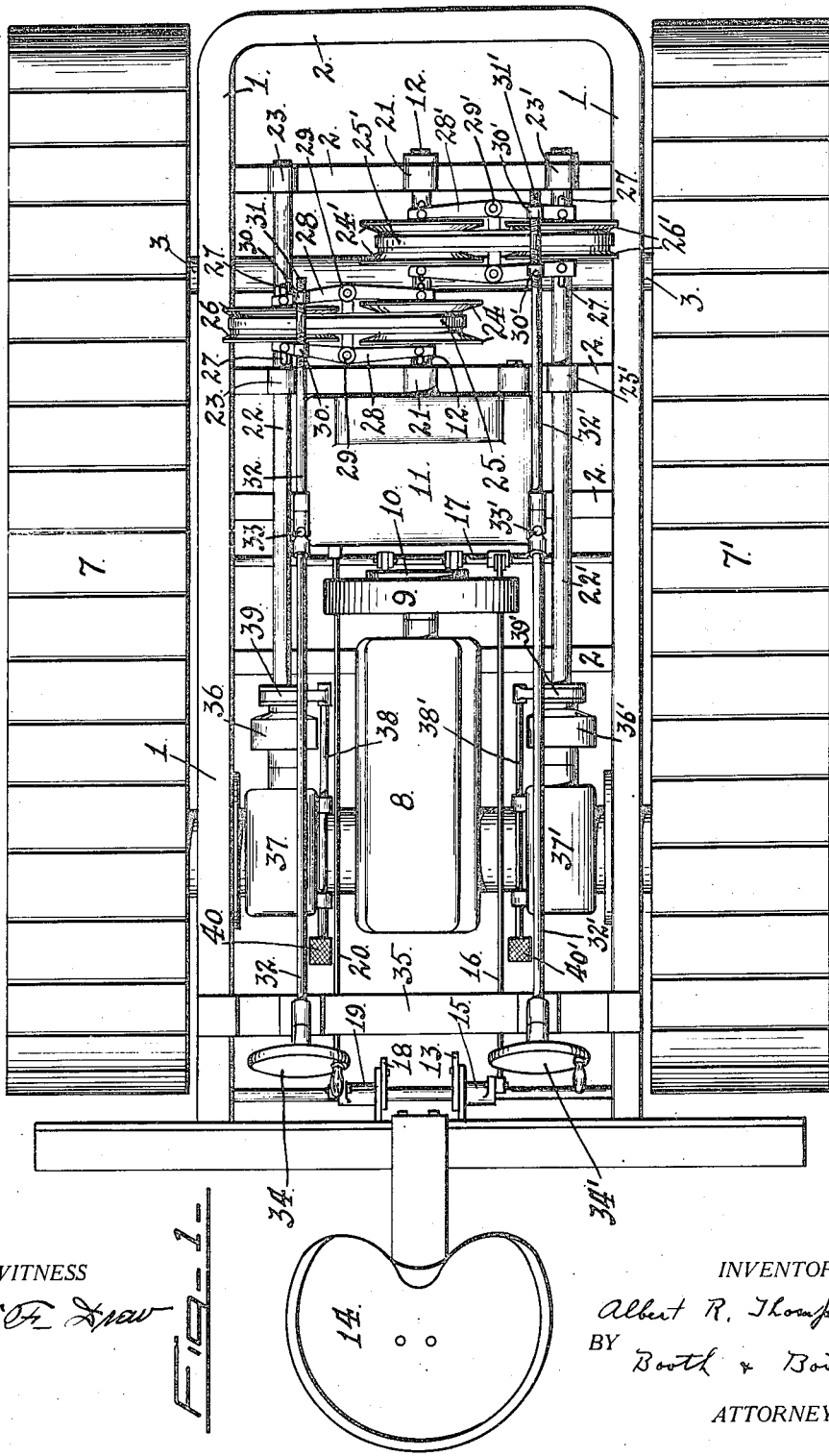

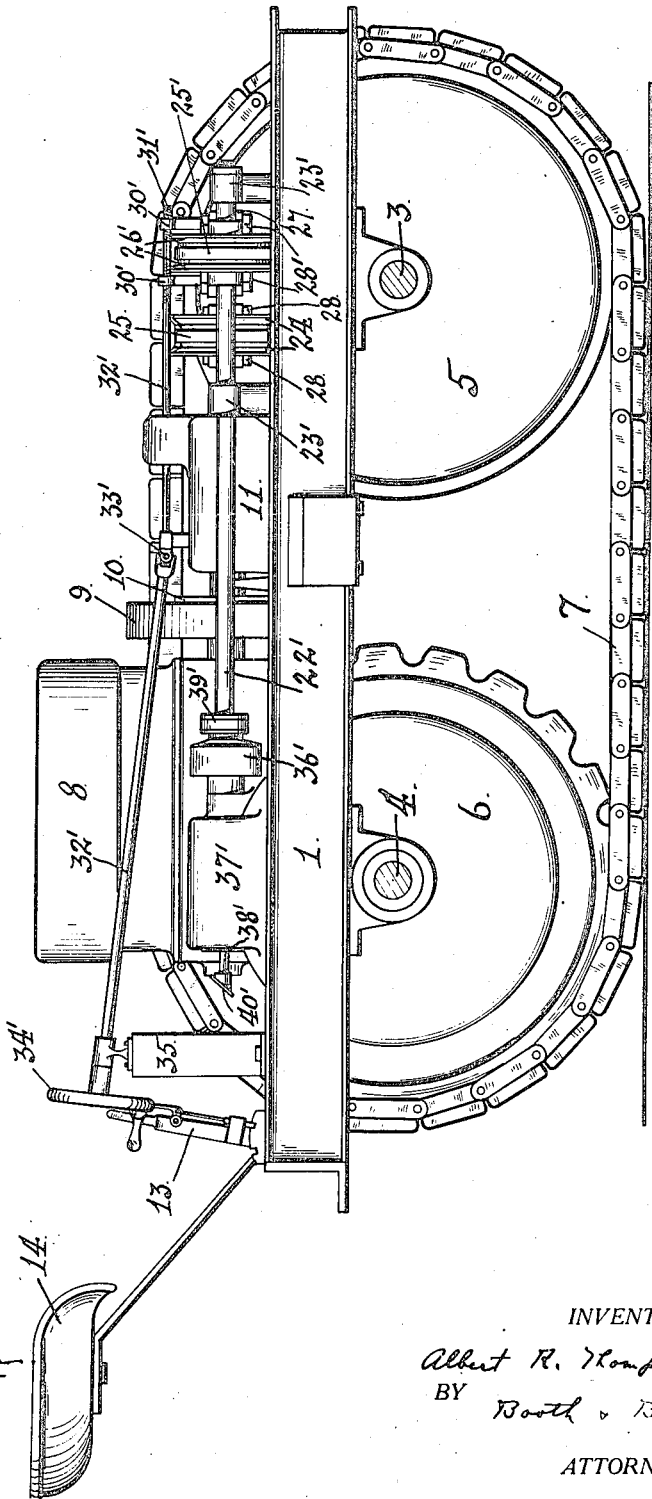

ALBERT R. THOMPSON, OF SAN JOSE, CALIFORNIA, ASSIGNOR TO ANDERSON-BARNGROVER MFG. CO., OF SAN JOSE, CALIFORNIA, A CORPORATION OF CALIFORNIA.

TRACTION-ENGINE.

1,278,256.        Specification of Letters Patent.     Patented Sept. 10, 1918.

Application filed December 4, 1916. Serial No. 134,843.

*To all whom it may concern:*

Be it known that I, ALBERT R. THOMPSON, a citizen of the United States, residing at San Jose, in the county of Santa Clara and State of California, have invented certain new and useful Improvements in Traction-Engines, of which the following is a specification.

My invention relates to traction engines, particularly of the type having two wheels, or two endless flexible self laying tracks.

The object of the invention is to provide improved means for controlling and guiding a traction engine of the described type, without necessitating the use of a guiding wheel or runner. By this construction, a tractor can be made with only two wheels, or flexible treads, both of which are used for driving, and which carry the entire weight of the machine. The maximum tractive effort, for a given power and weight, is thus secured, and at the same time the machine may be made more compact and therefore easier to handle in limited spaces.

My invention is particularly adapted to endless flexible track laying tractors, for the reason that such vehicles are amply supported by their two tracks, and need no other wheel or runner for purposes of support. It may well be applied, however, to two-wheel tractors of the type in which a part of the weight of the tractor is supported by the load vehicle, or by a third caster wheel not used for steering.

I am aware that flexible-track-lying tractors have been constructed without any steering wheel, the guiding being roughly accomplished by entirely disconnecting one or the other traction wheel from the engine, by means of a power-transmitting clutch. I am also aware of the same guiding effect being attempted by means of a clutch for each wheel and permitting either of said clutches to slip. With such construction, if the tractor tends to run continually toward one side, on account of some condition either of the load or of the ground surface, the operator is compelled to release and engage the clutch or to permit the said clutch to slip upon the leading side repeatedly and continually, to keep the machine in a straight path. Such conditions are very frequent; for example, when plowing, one tread of the tractor runs upon hard unbroken ground, and the other in the soft ground of the furrow; or when running upon a side hill; or if the load is pulled from one side of the tractor, as is frequently done with agricultural implements; in all these cases the tractor tends to run to one side, and some means must be provided for exerting a continuous and readily controlled guiding force upon it.

This is accomplished by my invention by the improved means to be presently described, with reference to the acompanying drawings, wherein—

Figure 1 is a plan view of my traction engine, certain parts being omitted for the sake of clearness.

Fig. 2 is a part-sectional side elevation, of the same.

In the drawings, the numeral 1 designates the longitudinal frame members of the machine, which are held in fixed spaced relation by transverse frame members 2. Said frame is supported by means of axles 3 and 4, upon which are respectively carried idler wheels 5 and driving wheels 6, the wheels of one side of the machine being shown in Fig. 2. The two alined wheels 5 and 6 carry an endless flexible tread or track member 7, shown in the drawings as comprising an articulated series of metal blocks. The lower run of said tread rests upon the ground, and forms a track upon which the wheels 5 and 6 roll. The driving wheel 6 is suitably formed to provide driving engagement with said track.

A similar endless track 7', Fig. 1, is carried by the wheels of the other side of the machine. The two tracks are independent; that is, the forward idler wheels revolve freely upon their axle 3, and the rear driving axle 4 is divided, one-half driving each wheel.

A source of motive power 8, here shown as an internal combustion engine, is mounted upon the frame, toward the rear thereof. The crank shaft of said motor carries the usual balance wheel 9, within which is housed a friction clutch 10 of any well known form. From this clutch the power is transmitted to a suitable reversing gear indicated at 11, by means of which the driven shaft 12 may be rotated in either direction, to drive the vehicle either forward or backward. The clutch 10, as shown, is controlled by a lever 13, conveniently located with respect to the driver's seat 14, and connected, through the short rock-shaft 15 and a lineally disposed rod 16, with a member 17 adapted to operate the movable clutch member. The reversing gear 11 is controlled by a similar lever 18, operating through a short rock-shaft 19 and a rod 20.

The shaft 12 is extended forwardly from the reversing gear 11, and supported in suitable bearings 21 carried by the transverse frame members 2. Parallel with said shaft, and located upon either side of the frame, are drive shafts 22 and 22', Fig. 1, supported by suitable journals 23 and 23'. Said drive shafts 22 and 22' are connected with and driven by the central engine shaft 12, by means of independent positive speed-varying mechanisms.

For purposes of illustration, I have shown a well known form of such mechanism, comprising adjustable V-groove pulleys 24 and 24' carried by the engine shaft 12, and connected by means of suitable belts 25 and 25', respectively, with similar pulleys 26 and 26' carried by the respective drive shafts 22 and 22'. These pulleys are understood to be split in the plane of the center or bottom of the groove, and the two halves are adjustable toward or away from each other, to make the effective diameter of the pulley larger or smaller. For this purpose the pulley members are slidably mounted upon their respective shafts, and are prevented from turning thereupon by keys or splines 27.

The sections of the driving pulley 24 are connected with the corresponding sections of the driven pulley 26 by means of levers 28, fulcrumed at 29, and preferably forked at their ends, as shown in Fig. 2. Said levers are provided with right and left threaded nuts 30, through both of which passes a turn-buckle-screw 31. Therefore, when said turn-buckle-screw is rotated in one direction, the inner ends of the levers 28 are separated, and their outer ends brought together. The effective diameter of the driven pulley 26 is thus increased, while that of the driving pulley 24 is correspondingly decreased, the tension on the belt 25 remaining constant. The speed of the driven pulley, relative to that of the driving pulley, is thus decreased, and its torque is increased. Opposite rotation of the turn-buckle screw 31, of course, produces an opposite variation in speed and torque.

The sections of the driving pulley 24' are similarly connected with the corresponding sections of the driven pulley 26' by means of levers 28', fulcrumed at 29', and operated by means of a turn-buckle screw 31', which engages nuts 30' carried by said levers. The turn-buckle screws 31 and 31' are rotated by means of lineally disposed shafts 32 and 32' respectively, universally jointed at 33 and 33', and carrying at their rear ends hand wheels 34 and 34'. A bracket 35 supports said hand wheels within easy reach of the driver.

The drive shafts 22 and 22' extend rearwardly, and are provided with suitable power transmitting clutches indicated at 36 and 36' in Fig. 1, and beyond said clutches are connected in driving relation with the rear axles 4 and 4', preferably by means of worm gearing inclosed within the housings shown at 37 and 37'. The clutches 36 and 36' are controlled by slidably mounted rods 38 and 38' respectively, which are suitably connected, at their forward ends, with said clutches, by means of forked arms 39 and 39', and are provided at their rear ends with pedals 40 and 40'. It is understood that suitable springs, not shown in the drawings, are provided for retaining said rods 38 and 38' in their rearward positions.

It will be readily seen that the operator can control either driving tread positively and independently of the other, by means of the positive variable-speed mechanisms and the clutches 36 and 36'. If the machine tends to run toward one side, or if the operator desires it to do so, as when traveling in a curved path, the variable-speed mechanisms may be relatively adjusted, by means of the hand wheels 34 and 34', to cause one tread to have any desired constant speed relative to that of the other tread. The variable speed mechanisms may also be controlled simultaneously, to provide any desired speed and torque ratio between the engine and the driving treads.

When it is desired to make a short turn, one tread may be entirely disconnected from the engine, by means of its clutch 36 or 36', as the case may be. The stationary tread then becomes a pivot about which the driving tread travels, to turn the machine.

I claim:—

1. A traction-engine comprising a frame; a pair of driving and supporting wheels disposed one on each side of the frame; a motor carried by the frame; a driven shaft operated by the motor; a pair of parallel longitudinally directed shafts carried by the frame one on each side; an adjustable split V-groove pulley carried by each side shaft; a pair of corresponding adjustable split V-groove pulleys carried by the motor driven shaft; belts extending between the corresponding pulleys of the side shafts and the motor driven shaft; separately operatable connections under control of the operator for independently adjusting the coacting pulleys of each side to vary the speed transmitted; and driving connections between said side shafts and the respective supporting wheels.

2. A traction-engine comprising a frame; a pair of driving and supporting wheels disposed one on each side of the frame; a motor carried by the frame; a driven shaft operated by the motor; a clutch member and a reversing gear associated with said shaft; a pair of longitudinally directed parallel shafts carried by the frame one on each side; an adjustable split V-groove pulley carried by each side shaft; a pair of corresponding adjustable split V-groove pulleys carried by the motor driven shaft; belts extending between the corresponding pulleys of the side shafts and the motor driven shaft; separately operatable connections under control of the operator for independently adjusting the coacting pulleys of each side to vary the speed transmitted; a separately operatable clutch member interposed in each side shaft; and driving connections between said side shafts and the respective supporting wheels.

In testimony whereof I have signed my name to this specification in the presence of two subscribing witnesses.

ALBERT R. THOMPSON.

Witnesses:
W. F. BOOTH, Jr.,
D. B. RICHARDS.